(12) United States Patent
Hornbostel

(10) Patent No.: US 6,219,621 B1
(45) Date of Patent: Apr. 17, 2001

(54) SPARSE HYPERBOLIC INVERSION OF SEISMIC DATA

(75) Inventor: Scott C. Hornbostel, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 0 days.

(21) Appl. No.: 09/344,099

(22) Filed: Jun. 25, 1999

Related U.S. Application Data

(60) Provisional application No. 60/091,286, filed on Jun. 30, 1998.

(51) Int. Cl.[7] .................................................. G06F 19/00
(52) U.S. Cl. ................................................. 702/16; 702/14
(58) Field of Search ......................... 702/16, 14; 367/72, 367/38; 324/345

(56) References Cited

U.S. PATENT DOCUMENTS

| | | | |
|---|---|---|---|
| 5,132,938 | * | 7/1992 | Walters ................................. 367/38 |
| 5,821,753 | * | 2/1999 | Stanley et al. ....................... 324/345 |
| 5,873,050 | * | 2/1999 | Schneider, Jr. et al. .............. 702/14 |

OTHER PUBLICATIONS

Hampson, D., 1986, "Inverse velocity stacking for multiple elimination," Journal of the Canadian Society of Exploration Geophysicists, 22, pp. 44–55.

Levin, F. K., and Shah, P. M., 1977, "Peg-leg multiples and dipping reflectors," Geophysics, 42, pp. 957–981.

Nichols, D., 1994, "Velocity-stack inversion using $L_p$ norms," Stanford Exploration Project Report 82.

Shuey, R. T., 1985, "A simplification of the Zoeppritz equations," Geophysics, 50, pp. 609–614.

Thorson, J. R., and Claerbout, J. F., 1985, "Velocity-stack and slant-stack stochastic inversion," Geophysics, 50, pp. 2727–2741.

Lumley, D. E., Nichols, D., and Rekjal, T., 1996, "Amplitude-preserved multiple suppression," SEG International Convention Extended Abstracts, pp. 1461–1463.

* cited by examiner

*Primary Examiner*—Jay Patidar
*Assistant Examiner*—Victor J. Taylor
(74) *Attorney, Agent, or Firm*—Keith A. Bell

(57) ABSTRACT

A method of sparse hyperbolic inversion is used to suppress multiples in marine seismic data. By explicitly including the two-way water-bottom reflection traveltime and water-bottom reflection coefficient as part of an augmented model domain, the inversion may be successfully carried out even for intermediate water depths and sloping water bottoms. Linear noises can also be suppressed by appropriate definition of the model. The invention also has the capability of handling time-varying wavelets or several different wavelets simultaneously. This latter capability is useful in suppressing dispersive ground roll on land seismic data.

22 Claims, 7 Drawing Sheets

SPARSE HYPERBOLIC INVERSION OF SEISMIC DATA

REFERENCE TO RELATED APPLICATIONS

This application claims the benefit of U.S. Provisional Application No. 60/091,286, filed Jun. 30, 1998.

FIELD OF THE INVENTION

This invention relates generally to the field of seismic prospecting and, more particularly, to seismic data processing. Specifically, the invention is an improved method for suppressing multiple reflections, especially water-bottom multiples, in seismic data.

BACKGROUND OF THE INVENTION

In the oil and gas industry, seismic prospecting techniques are commonly used to aid in the search for and evaluation of subterranean hydrocarbon deposits. In seismic prospecting, a seismic source is used to generate a physical impulse (known as a "seismic signal") that propagates into the earth and is at least partially reflected by subsurface seismic reflectors (i.e., interfaces between underground formations having different acoustic impedances). The reflected signals (known as "reflections") are detected and recorded by seismic receivers located at or near the surface of the earth, in an overlying body of water, or at known depths in boreholes, and the resulting seismic data may be processed to yield information relating to the subsurface formations.

The seismic energy recorded by each seismic receiver is known as a "seismic data trace." Seismic data traces typically contain both the desired primary reflections and one or more unwanted noise components that can interfere with the processing and interpretation of the desired the primary reflections. These noises may include random noise, multiple reflections, converted waves, and surface waves. Conventional noise suppression methods typically exploit some difference between the noise to be suppressed and the primary reflections (e.g., different frequency band or different dip). Frequently, however, these differences are not sufficient to allow a clean separation between the desired primary reflections and the targeted noise.

In the case where the unwanted noise is due to multiple reflections (hereinafter referred to as "multiples"), some prior art noise suppression techniques take advantage of differences between the normal moveout (NMO) velocities (hereinafter referred to as "moveout velocities") of the primary reflections and the multiples in a common-midpoint (CMP) gather of seismic data traces (i.e., a set of seismic data traces having the same midpoint but different source-to-receiver offset distances). Methods such as the Radon transform and velocity-stack inversion can be particularly useful in distinguishing the primary reflections from the multiples. These methods decompose the seismic data traces in the CMP gather into a set of moveout parabolas or hyperbolas in which the multiples can be identified and suppressed on the basis of moveout velocity differences.

Conventional velocity-based multiple suppression techniques can often be used to suppress multiples such as the peg-leg multiple illustrated in FIG. 1. FIG. 1 shows a seismic source 10 and a seismic receiver 12 located at or near the surface 14 of a body of water 16. A subsurface reflector 18 is located a distance below the water bottom 20. FIG. 1 shows two raypaths from seismic source 10 to seismic receiver 12. (For simplicity, FIG. 1 assumes a constant seismic velocity from source 10 to receiver 12 for both raypaths.) For primary raypath 22 (solid line), the seismic signal propagates downwardly from seismic source 10 to reflection point 24 on subsurface reflector 18 and then upwardly to seismic receiver 10. In other words, for primary raypath 22, the seismic signal is reflected only once. However, for peg-leg multiple raypath 26 (dashed line), the seismic signal is reflected three times, once at reflection point 28 on subsurface reflector 18, once at point 30 on the surface 14 of body of water 16, and once at point 32 on the water bottom 20.

As would be well known to persons skilled in the art, multiples resulting from reverberation of the seismic energy within the water layer (hereinafter referred to as "water-bottom multiples") may involve several reflections in the water layer, and these reflections may occur at either or both ends of the raypath. Water-bottom multiples may have amplitudes comparable to the amplitude of the related primary reflection. Therefore, it is important to remove these multiples from the seismic data. In shallow water, water-bottom multiples can be easily removed by deconvolution techniques. In deep water, conventional velocity-based multiple suppression techniques can satisfactorily eliminate these multiples. However, velocity-based techniques are unable to satisfactorily suppress water-bottom multiples in intermediate water depths—ranging from about 100 meters to about 300 meters—because the difference between the moveout velocity of the primary reflection and the moveout velocity of the multiple is insufficient for satisfactory separation.

Prior art multiple suppression techniques do not make use of all available information. For example, an estimate of the water depth is usually available, either from direct measurements (e.g., by using sonar), or by examination of near-offset traces for multiple reflections. In the marine environment, the shape of the seismic energy generated by the source (i.e., the seismic wavelet) is usually known. Prior art multiple suppression techniques do not make use of this information in the multiple suppression process.

From the foregoing, it can be seen that there is a need for an improved method for suppressing multiple reflections, especially water-bottom multiples occurring in intermediate water depths, during processing of seismic data. Preferably, such a method should make use of any additional information which may be available, such as the water depth and the shape of the seismic wavelet. The present invention satisfies this need.

SUMMARY OF THE INVENTION

The present invention is an improved velocity-based method for suppressing multiple reflections in seismic data. The inventive method includes extra parameters in its model domain for the inversion process. For multiple elimination in intermediate water depths, the two-way water-bottom reflection traveltime and the water-bottom reflection coefficient are used in addition to the conventional subsurface velocity model. The permissible ranges of these two extra parameters may be obtained from the autocorrelation of short offset seismic data and from a priori geological information. Because these water-bottom parameters are explicitly included in the inversion model, reliance on differences in moveout velocity between the primary reflections and the multiples is obviated.

The inventive method inverts the data gather to determine a best-fit sparse representation in the model domain. The optimization is done using a $L_p$-norm to be consistent with a sparse model representation. Preferably, a Lanczos subroutine is used in the matrix inversion step of the inversion process. In a preferred embodiment, a limited number of traces are used in the initial steps of the inversion, while in the later steps, a smaller model domain is used. This leads to an increase in the computation speed and, accordingly, a reduction in computing time and cost. After the data gather has been inverted into the model domain, one or more filtering operations are used to suppress the multiples, and the filtered model domain data are then transformed back to the data domain.

The inventive method may also be used to suppress linear noises, such as refraction arrivals, and dispersive noises, such as ground roll on land seismic data, by making appropriate modifications to the model domain.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which are included within the spirit and scope of the invention, as defined by the appended claims.

DETAILED DESCRIPTION OF THE PREFERRED EMBODIMENTS

The present invention may be better understood by first describing the basis for conventional velocity-based multiple suppression techniques. Consider the modeling equation:

$$d = Hm \quad (1)$$

where d is the actual data (i.e., the traces of a particular CMP gather) in the data domain, m is the modeled data in the model domain, and H is a modeling matrix that relates d to m. As would be well known to persons skilled in the art, many filtering operations can be performed more easily in the model domain than in the data domain. Therefore, conventional multiple suppression techniques invert equation (1) to obtain modeled data m that adequately describe the actual data d. After the measured data has been transformed from the data domain to the model domain, one or more filtering operations are performed on the modeled data, and the filtered data are then transformed back to the data domain using equation (1).

Figure 1:
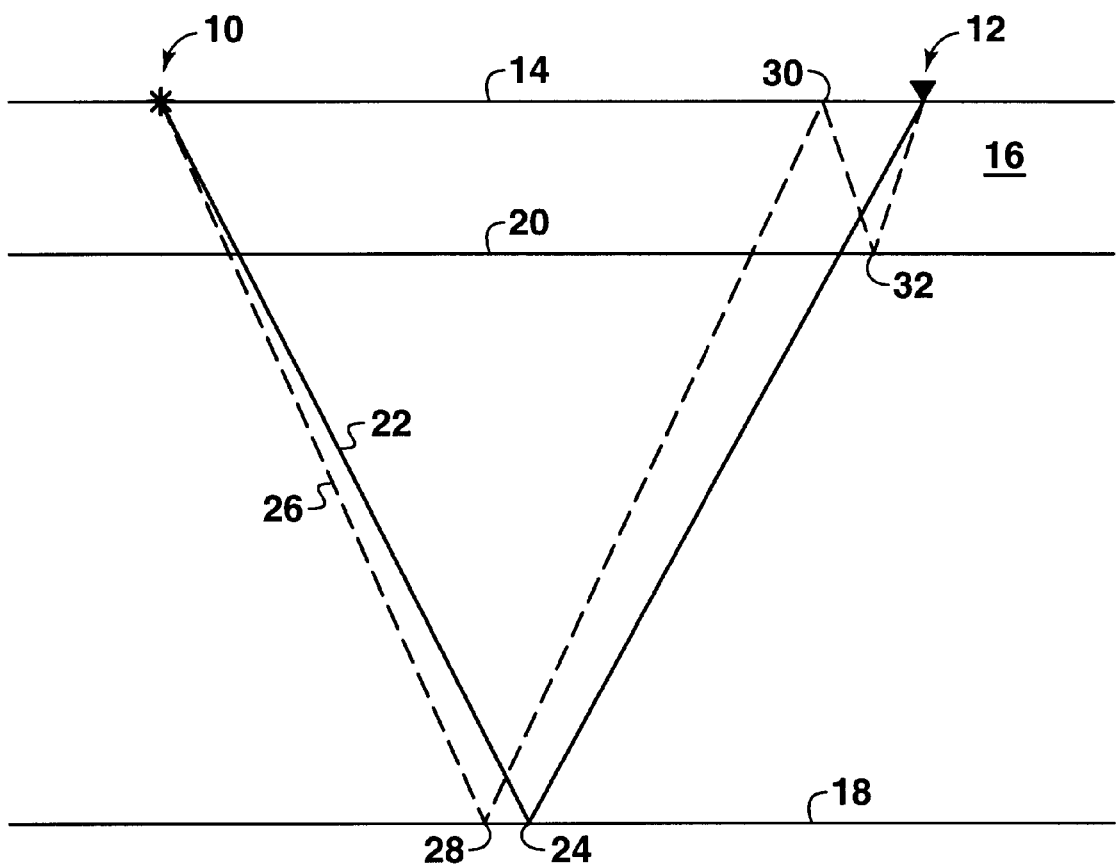
FIG. 1 illustrates the raypath geometry for a primary reflection and a peg-leg multiple reflection.
Figure 2:
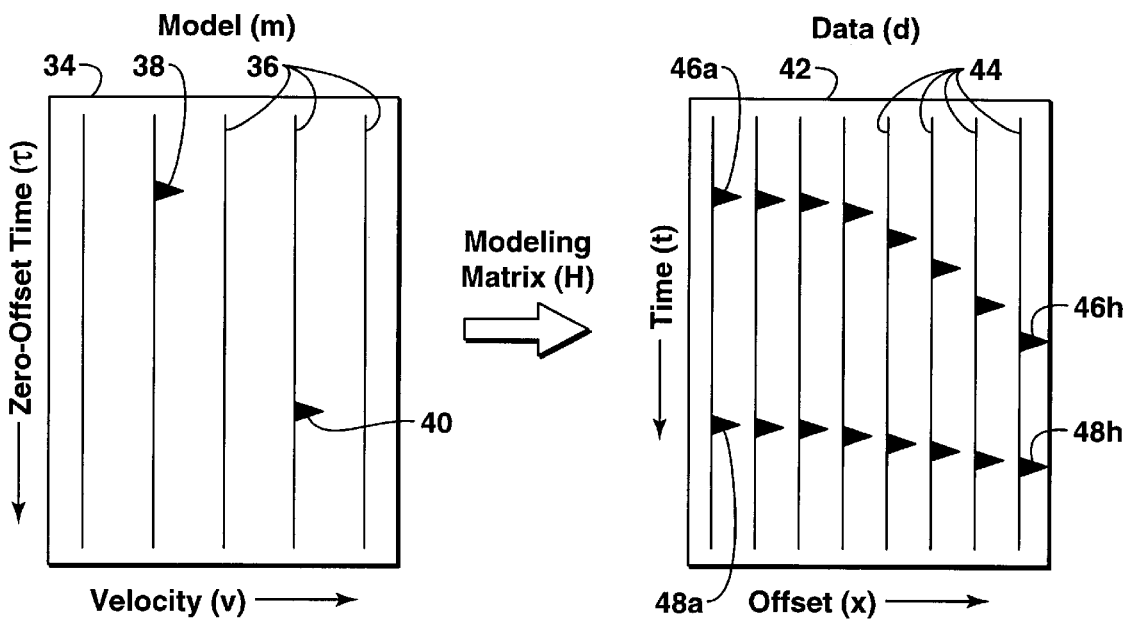
FIG. 2 illustrates the mapping of model domain to data domain for a first embodiment of the present invention.

FIG. 2 illustrates the relationship between the actual data and the modeled data. The model domain 34 contains a number of velocity traces 36. Each of the velocity traces 36 corresponds to a different moveout velocity, v. For purposes of simplifying the illustration, only five velocity traces 36 are shown; in reality, there would be considerably more than five moveout velocities, denoted by $N_v$, in the model domain. The vertical axis corresponds to zero-offset traveltime, τ. The velocity traces are shown as continuous values: it being understood that zero-offset traveltime actually takes on a discrete set of digitized values, denoted by $N_\tau$. In the example shown, the model domain is sparse: there are only two non-zero values in the entire model domain, denoted by reference numerals 38 and 40. The modeled data m corresponding to model domain 34 could be defined, for example, by the concatenation of all velocity traces 36 to define a model vector of length $N_v \times N_\tau$. This model vector would, in the example shown in FIG. 2, contain all zero values except for the two non-zero values 38 and 40.

The data domain corresponding to the model domain 34 is denoted by reference numeral 42. A number of data traces 44 are contained in the data domain. Each of the data traces 44 corresponds to a different source-receiver offset distance, x. The vertical axis in the data domain is two-way traveltime, t. For illustrative purposes, only eight data traces are shown in data domain 42. In reality, there would typically be one for every offset within the CMP gather. This number is denoted by $N_{tr}$. The traces are shown as continuous values: it being understood that the two-way traveltime actually takes on a discrete set of digitized values, denoted by $N_t$. The data domain can then be defined by a data vector of length $N_{tr} \times N_t$ by concatenation of the individual traces 44.

In the example shown in FIG. 2, the model domain 34 has only two non-zero values 38 and 40. Each of these non-zero values, with its unique values of zero-offset traveltime τ and moveout velocity v, defines a hyperbola in the data domain according to the moveout equation:

$$t = \sqrt{\tau^2 + \frac{x^2}{v^2}} \quad (2)$$

where x is the offset in the data domain. The hyperbola corresponding to model point 38 yields the upper reflections 46a through 46h on the eight data traces 44 in data domain 42, with reflection 46a being on the nearest offset trace in the data gather and reflection 46h being on the farthest offset trace. Similarly, the hyperbola corresponding to model point 40 yields the lower reflections 48a through 48h on the eight data domain traces.

Corresponding to the model vector (of length $N_v \times N_\tau$) and the data vector (of length $N_{tr} \times N_t$), a matrix H can be defined according to equation (1). The modeling matrix H takes each sample in the model domain and maps it to a hyperbola in the data domain according to equation (2). As would be well known to persons skilled in the art, modeling matrix H may be very large and, accordingly, is preferably implemented through a suitably programmed digital computer.

In velocity-stack inversion (a conventional multiple suppression technique), the first step is to find modeled data m such that Hm is a close approximation of the actual data d. This determination of the model data is time consuming and requires the calculation of an inverse of the modeling matrix H. Because of the size of typical problems, this is generally done using an approximate iterative method (e.g., conjugate gradient). Once in the model domain, filtering is performed prior to return to the data domain. For example, primary reflections usually have higher moveout velocities than later-arriving multiples that have propagated through a greater distance in water where seismic velocities are lower. If the difference in moveout velocities is large enough, a simple filtering operation might consist of zeroing out portions of the model data that are believed to be multiples prior to transforming the data back to the data domain. This operation, however, is difficult or impossible when there is insufficient difference between the moveout velocities of the primary reflections and those of the multiples, as in intermediate water depths.

Figure 3:
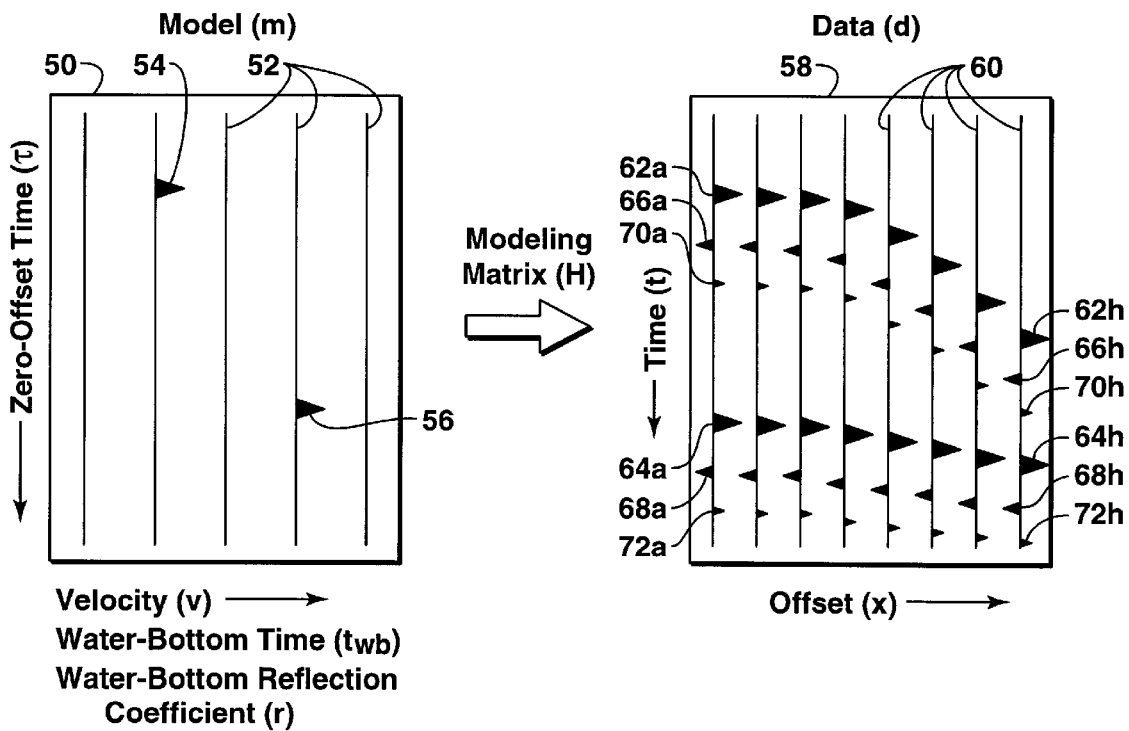
FIG. 3 illustrates the mapping of model domain to data domain for a second embodiment of the present invention.

FIG. 3 illustrates the relationship between the model domain and the data domain for one embodiment of the present invention. As in FIG. 2, the model domain 50 contains a number of velocity traces 52, each corresponding to a different moveout velocity, v. For simplifying the illustration, only five velocity traces 52 are shown; in reality, there would be considerably more than five moveout velocities in model domain 50, denoted by $N_v$. The vertical axis, as in FIG. 2, corresponds to zero-offset traveltime, τ. The number of values of zero-offset traveltime are denoted by $N_\tau$. Two additional parameters, two-way water-bottom reflection traveltime, $t_{wb}$, and water-bottom reflection coefficient, r, are defined as additional dimensions of model domain 50. These parameters may take on a discrete number of values, $N_{wb}$ and $N_r$, respectively. The model vector corresponding to model domain 50 is now a vector of length $N_v \times N_\tau \times N_{wb} \times N_r$. In the example shown, the model domain is sparse: there are only two non-zero values in model domain 50, denoted by 54 and 56.

The dimensionality of the model vector is a multiple of $N_v \times N_\tau$, depending on the number of possible values of the two additional parameters, $t_{wb}$ and r. For example, the two-way water-bottom reflection traveltime might be allowed to have one of three values centered on an estimated value as discussed below. This increases the dimensionality of the model vector by a factor of three. Similarly, the water-bottom reflection coefficient would also increase the dimensionality of the model vector depending upon the number of possible values it may take. The dimensionality of the model vector and of the data vector (of length $N_{tr} \times N_t$, as discussed above in connection with FIG. 2) defines a matrix H according to equation (1).

The data domain corresponding to the model domain 50 is denoted by reference numeral 58. A number of data traces 60 are in data domain 58. Each of the data traces 60 corresponds to a different source-receiver offset distance, x. The vertical axis in data domain 58 is two-way traveltime, t. For illustrative purposes, only eight data traces 60 are shown in data domain 58. In reality, there would typically be one for every offset within the CMP gather that is recorded in the actual data. This number is denoted by $N_{tr}$. The traces are shown as continuous values: it being understood that the two-way traveltime actually takes on a discrete set of digitized values, denoted by $N_t$. Data domain 58 can then be defined by a vector of length $N_{tr} \times N_t$.

Data domain 58 is more complex than data domain 42 in FIG. 2. However, close observation shows some similarities. Persons skilled in the art will recognize that the reflections labeled as 62a through 62h are identical to reflections 46a through 46h in FIG. 2. Similarly, reflections 64a through 64h in FIG. 3 are identical to reflections 48a through 48h in FIG. 2. All of these reflections are primary reflections.

However, data domain 58 also includes other reflection events. For example, the reflections labeled 66a through 66h are water-bottom peg-leg multiples of primary reflections 62a through 62h. In other words, reflections 66a through 66h correspond to rays that have bounced once in the water layer. Provided that the two-way water-bottom reflection traveltime, $t_{wb}$, is known, the traveltimes of these peg-leg multiple events at the various offsets x can be predicted by well-known equations similar to equation (2). The water-bottom reflection coefficient, r, as well as geometric spreading effects known to persons skilled in the art, can be used to determine the amplitude of the peg-leg multiple events.

Similarly, the reflections labeled 68a through 68h are water-bottom peg-leg multiples of primary reflections 64a through 64h. The traveltimes and amplitudes of these peg-leg multiple events can be determined from knowledge of the two-way water-bottom reflection traveltime, $t_{wb}$, and the water-bottom reflection coefficient, r.

The events labeled 70a through 70h and 72a through 72h correspond to rays that have bounced twice in the water layer. The amplitudes and traveltimes of these events are also entirely determinable from the model parameters.

Before going into details of the present invention, an awareness of the size of the problem is desirable. Current methods of seismic recording typically have 120 to 240 traces in a CMP gather with each trace having up to 2400 discrete data samples (or even more) in time. This gives a data vector having as many as 576,000 data points. In a hypothetical case where the number of zero-offset traveltimes is the same as the number of discrete data samples in time (e.g., 2400), and for a typical case where the moveout velocities range from 1500 meters/second to 4000 meters/second in steps of 12.5 meters/second (i.e., 200 different moveout velocities), the model vector could have 480,000 samples, without even considering the additional dimensionality introduced by the two-way water-bottom reflection traveltime and the water-bottom reflection coefficient. The inversion of matrices of this size is beyond the capabilities of modern digital computers to accomplish in a reasonable time.

In order to accelerate the computation process, the present invention utilizes a priori information to limit the range of values in the model domain. This information may include an estimate of the seismic wavelet, as well as estimated ranges for the moveout velocity of the primary reflections, water-bottom reflection coefficient and two-way water-bottom reflection traveltime.

One of the pieces of a priori information that may be used in connection with the present invention is an estimate of the seismic wavelet. Wavelet estimation is well understood by persons skilled in the art. The present invention uses a sparse model, i.e., the method is strongly biased towards finding a few, relatively strong, reflection events. For a sparse inversion, it is preferable to find a wavelet that, when convolved with a sparse reflection sequence, will match the data. In the context of sparse inversion, an error in the wavelet estimation towards a higher frequency estimate is not unduly detrimental because a lower frequency wavelet can be constructed from higher frequency wavelets. A measurement of the actual outgoing signal from the seismic source could be used to provide an estimate of the wavelet. A presently preferred alternative and simple approach to wavelet estimation is to select an isolated pulse from the data. In another alternative, the spectral content in the zone of interest is examined and, for example, a zero-phase or minimum-phase Ricker wavelet is used. Any of these alternatives works satisfactorily.

In a preferred embodiment of the invention, the wavelet is assumed to be time-invariant. However, in special cases, a time-varying wavelet may be used. Methods of determination of a time-varying wavelet based upon knowledge of the absorption coefficient of seismic waves would be known to those skilled in the art. In yet another alternative, a set of possible wavelets may constitute another dimension in the model space, and the inversion process, discussed below, selects one of these during the inversion.

Another piece of a priori information that may be used in connection with the present invention is a range of moveout velocities in the model domain. Selected common midpoint (CMP) gathers of seismic data are analyzed by a velocity analysis program. An estimated velocity function is picked and a range of moveout velocity values in the model domain is specified around this picked velocity function. The model domain is given as a corridor containing this picked function and typically includes the picked function plus or minus about five percent. This corridor allows for uncertainties in the picked function and also allows the building of amplitude variation with offset (AVO) effects (i.e., spatial amplitude variations) as a sum of slightly different velocity hyperbolas. These AVO effects, as well as methods for picking a velocity function, would be familiar to persons skilled in the art.

The two-way water-bottom reflection traveltime estimate is used to aid in modeling water-bottom multiples. In a preferred embodiment, the two-way water-bottom reflection traveltime is obtained from autocorrelations of near-offset traces. In an alternate embodiment, the two-way water-bottom reflection traveltime can be obtained by hand digitizing the input seismic data. In yet another embodiment the two-way water-bottom reflection traveltime estimate is obtained by an automatic picking program that determines the two-way water-bottom reflection traveltime on a near-offset trace and corrects it for normal moveout (NMO) based on the known velocity of sound in water. In one embodiment of the invention, the model domain is specified about the value obtained by any of these methods with an allowable variation of, for example, four milliseconds.

The water-bottom reflection coefficient is also used to aid in modeling water-bottom multiples. In a preferred embodiment, portions of stacked seismic data or near-offset traces are examined. Water-bottom multiples should decay according to the relative sequence $1, r, r^2, r^3 \ldots$ after accounting for spherical spreading. Accordingly, examination of the relative amplitudes of these reflections gives an estimate of the water bottom reflection coefficient, r. In an alternate embodiment, the water-bottom reflection coefficient is estimated from the relative decay of peg-leg multiples, that should decay according to the relative sequence $1, 2r, 3r^2, 4r^3 \ldots$ These examinations may be used to get a rough estimate of r, as well as an estimate of the possible variation from this value.

Preferably, the present invention is used to process common midpoint (CMP) gathers of seismic data traces; however, the inventive method may also be used to process other types of data gathers. The first step of the inventive method is to invert the gather of seismic data traces from the data domain to the model domain to obtain modeled data that adequately represent the actual data. Equation (1) forms the basis for the inversion. A least squares estimate of the modeled data, m, is determined by minimizing a residual-error objective function:

$$E = \|W_r(d - Hm)\|^2 \quad (3)$$

with respect to m, where E is the residual error and $W_r$ is a weighting matrix.

Preferably, the diagonal elements of the weighting matrix $W_r$ are chosen as $$diag W_r = |m_i|^{(2-p)/2} \quad (4)$$

where $m_i$ is the $i^{th}$ element of the current estimate of the model vector.

To save computation time, the minimization is performed in stages with the process being restarted at the end of each stage. A convergence schedule is used in which less data (i.e., a few traces) are used in the initial stages of the minimization process while a smaller model domain is used in the later restarts.

Figure 4:
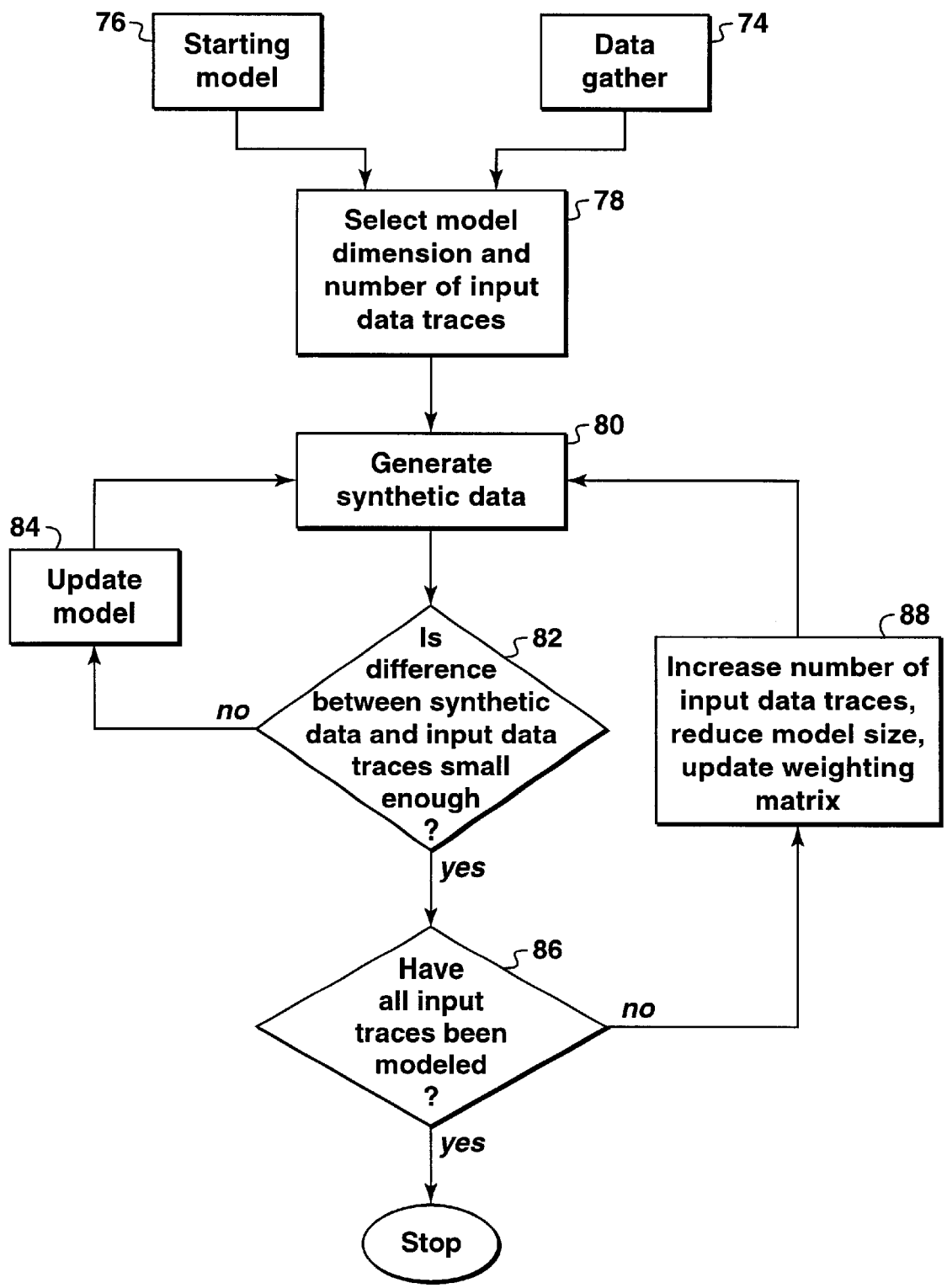
FIG. 4 is a flowchart illustrating the iterative Lanczos scheme with restarts used in the present invention.

The inversion process is illustrated in FIG. 4. Inputs to the inversion process are the original data gather 74 and a starting model 76 (which may include some or all of the a priori information discussed above). At step 78, a subset of the number of traces in the gather and the model size are selected. For example, in the inversion of a 100 trace gather with an initial model domain consisting of 200,000 samples, the inversion might start with 11 traces and 200,000 samples. The selection of the number of traces is discussed below.

A Lanczos subroutine (similar to a conjugate gradient method) is used for the inversion. The values of the weights are recalculated at each restart of the Lanczos routine. An $L_p$-norm for the weights is used instead of the conventional Euclidean $L_2$-norm, with $0 \leq p \leq 2$. As would be known to those versed in the art, such an $L_p$-norm leads to a "sparse" inversion with relatively few non-zero points in the model domain. In a preferred embodiment, the value of p is chosen to lie between 0.5 and 1.5.

The inventive method provides an iterative approximation for the exact solution m to the objective function of equation (3). The method iterates until modeled data m are found that fit the actual data, d, after forward modeling, to within a specified error tolerance. The Lanczos subroutine finds a solution m that minimizes E in equation (3) with the weights as given by equation (4). As noted above, the weights are recalculated at each restart of the Lanczos routine. At this point, in the example, a model that matches 11 traces out of the 100 traces in the input data gather has been determined. Because of the $L_p$-norm used in the minimization, the model will be "sparse", i.e., many of the values will be relatively small. The various steps of the Lanczos subroutine are shown in the loop consisting of reference numerals 80, 82, and 84. The generation of synthetic data corresponding to the current model is done at reference numeral 80. This synthetic data is compared with the actual data at reference numeral 82, i.e., the error E in equation (3) is computed. If the error is sufficiently small, based on a user specified threshold, the process gets out of the loop; if the error is not sufficiently small, then the model is updated, shown at reference numeral 84, and updated synthetic data are again generated (reference numeral 80).

If the error is sufficiently small, then the process, as noted above, exits from the loop and checks to see if all the traces have been modeled (reference numeral 86). If not, then the number of traces is increased (reference numeral 88) for the next restart of the Lanczos subroutine. Because of the sparse nature of the solution found in the first start, the model domain can be safely reduced by removing the smallest model values. For example, the 200,000 model domain samples could be reduced to 95,000 samples. However, the number of traces is increased from 11 to a greater number, say 19. At the same time, the weighting matrix $W_r$ is updated using the current modeled data m, and the inversion process is restarted.

The Lanczos routine is once again used to find modeled data m that minimizes the residual error E in equation (3) with the weights as given by equation (4). The Lanczos subroutine iterates until the error E is below a user-specified tolerance level. At this point, a model that matches 19 traces out of the 100 traces in the CMP gather has been determined. This process of restarting is repeated until all the traces have been modeled. In the example discussed, the number of samples in the model domain is then reduced to, say 45,000 for the next restart, and 33 traces are matched. The third restart is performed with 58 traces and 21,000 samples, while the final restart uses all 100 traces and only 10,000 samples. Overall, this method of restarts lowers the computation time by a factor of approximately 20, as compared to an inversion of all 100 traces and 200,000 samples.

Once all the traces have been used in the inversion, the process stops. In the example above, the number of samples was reduced from 200,000 to 10,000 in 4 restarts. At each restart, the number of samples is reduced by a factor of approximately $(200,000/10,000)^{1/4}$. Similarly, the number of traces is increased from 11 to 100 in four restarts. At each restart, the number of traces is increased by a factor of approximately $(100/11)^{1/4}$. Those skilled in the art would recognize that the number of samples and the number of traces could be different depending upon the complexity of the subsurface and available computational resources (memory and computer time), The use of a priori information to constrain the model domain makes the computation faster (and hence practical) as well as making it more accurate. This feature is one of the key advantages of sparse inversion according to the present invention.

Once the data gather is inverted into the model domain, a number of approaches can be used for suppressing multiples. In one embodiment of the invention, each model domain value can be forward modeled to a primary reflection event. This is in contrast to the data where each point in the model domain gives rise to primary and multiple reflection events.

In another embodiment of the invention, a multiples-only gather is generated. By subtracting this multiples-only gather from the actual data gather, a multiple-free data gather is obtained. This approach is preferable in situations where it is desirable to retain unmodeled energy.

Sparse inversion can also be used in deeper-water cases or where there are additional noises at a moveout velocity that differs appreciably from the moveout velocity of the primary reflections. In these cases, each point in the model domain represents one hyperbola in the data domain, rather then a primary and all its associated multiples.

In another embodiment of the invention, the wavelet estimate is made time varying. Alternatively, a set of wavelets can be simultaneously used as an extra dimension in the model domain. By defining a set of wavelets as an extra dimension in the model domain, the method of the invention is able to model and invert simultaneous arrivals with different frequency contents. Dispersive waves can also be modeled with this approach by using a set of wavelets with varying frequency content that can be treated as separate arrivals at different velocities.

In yet another embodiment of the invention, the model domain is augmented by including linear moveouts in the data domain in addition to the hyperbolic moveouts that characterize reflections and multiple reflections. The sparseness of the inversion is not affected by the inclusion of both types of moveout because the model domain is essentially partitioned into two parts: in one part, a point creates a wavelet and its multiples with hyperbolic moveout, and in the other part, a point creates a wavelet with linear moveout. This enables the method of the present invention to handle other kinds of noises: e.g., ground roll that is commonly present on land seismic data has a linear moveout, as do refractions. Given a model, ground roll and refractions can be part of the modeling process. Characterization of the dispersive nature of a ground roll is accomplished by modeling it as a number of different linear moveouts, each of which has a different wavelet (as discussed above with reference to modeling time-varying wavelets).

In yet another embodiment of the invention, the amplitudes in the data domain have an amplitude variation with offset (AVO) dependence of the form $A=a+bx^2$ where x is the offset. In the model domain, two points are required to represent the values of a and b. This allows sparse inversion of data with AVO effects.

In a further embodiment, the invention is used to perform an $L_p$-norm deconvolution. This is accomplished by substituting a spike or other high-frequency wavelet into the modeling matrix (instead of the wavelet extracted from the data) during the final forward-modeling step.

In still another embodiment of the invention, inversion of data recorded with a dipping water bottom can be carried out. Formulas for modeling peg-leg multiples produced by a dipping water bottom are described in Levin, F. K. and Shah, P. M., "Peg-leg multiples and dipping reflectors," *Geophysics*, volume 42, pp. 957–981, 1977. These formulas can be simplified for the case of flat geology with small water bottom dips of less that ten degrees. In such a case, the $n^{th}$ order peg-leg in a data gather can be approximated by n+1 hyperbolae of constant velocity but with even spatial shifts of the apices. The distance between these apices is $4D\phi$ where D is the depth of the signal horizon and $\phi$ is the local water-bottom dip. The water-bottom dip can be calculated from the given water-bottom traveltimes, or can be provided as a separate input. The depth D can be calculated from the given velocity function. The split peg-leg multiples are then determined for each primary signal and can be used in place of the simple peg-leg multiple discussed above.

Persons skilled in the art would recognize that more complex models may be used. A set of data gathers from locations in close proximity could be simultaneously inverted with an extra dimension in model space to account for dips in the reflection signal from one gather to another. This approach further discriminates against noise by incorporating a priori knowledge of stacked-trace signal dips.

The model domain can be thought of as a compressed representation of the data gather. This representation is sparse and could be further reduced by removing samples having little or no impact on the modeled data. The data compression may have applications in data storage and data input/output improvements may be possible. Additionally, some operations such as normal moveout correction could be performed in the model domain.

Figure 5:
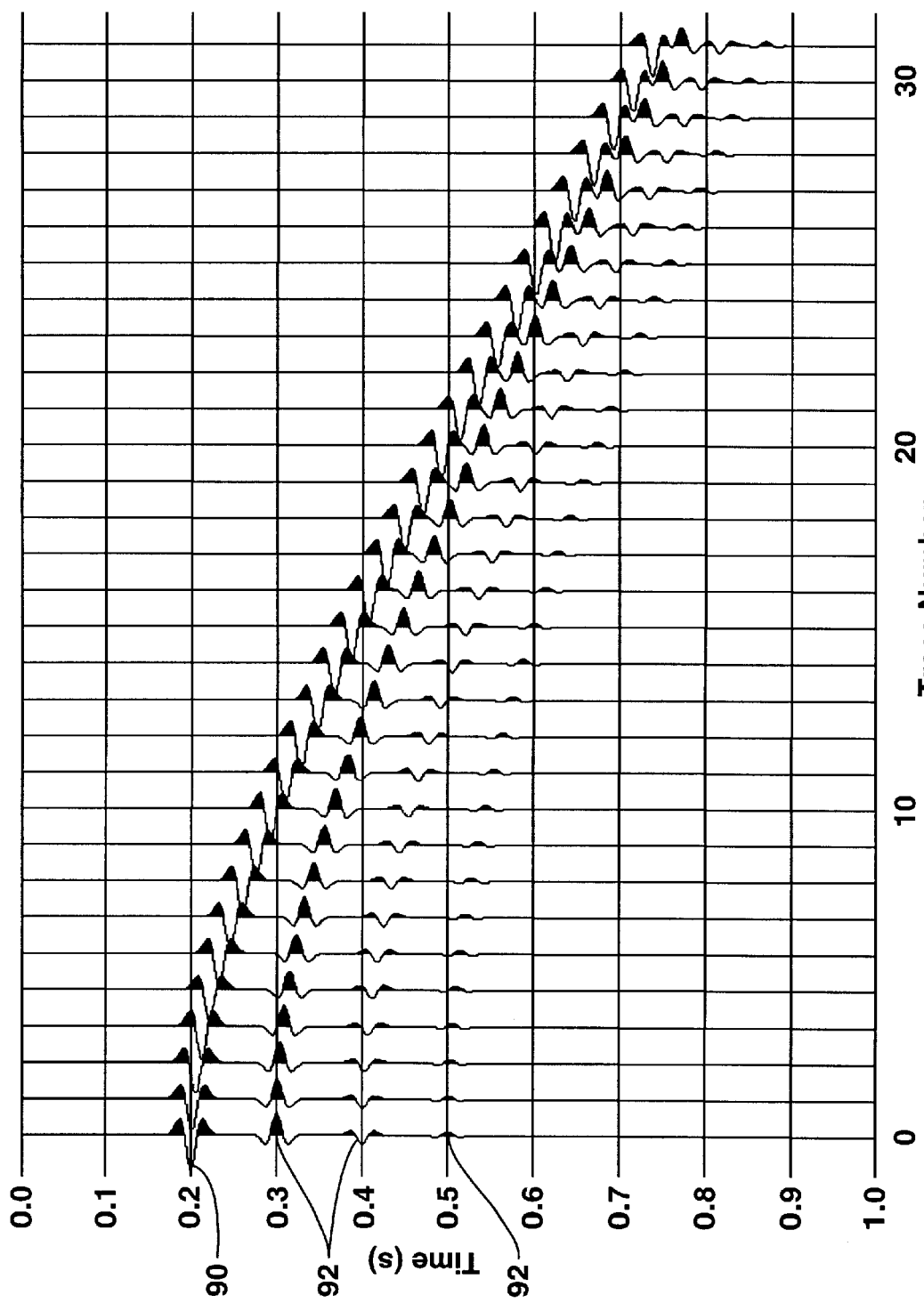
FIG. 5 shows an example of a synthetic CMP gather with intermediate period multiples.
Figure 6:
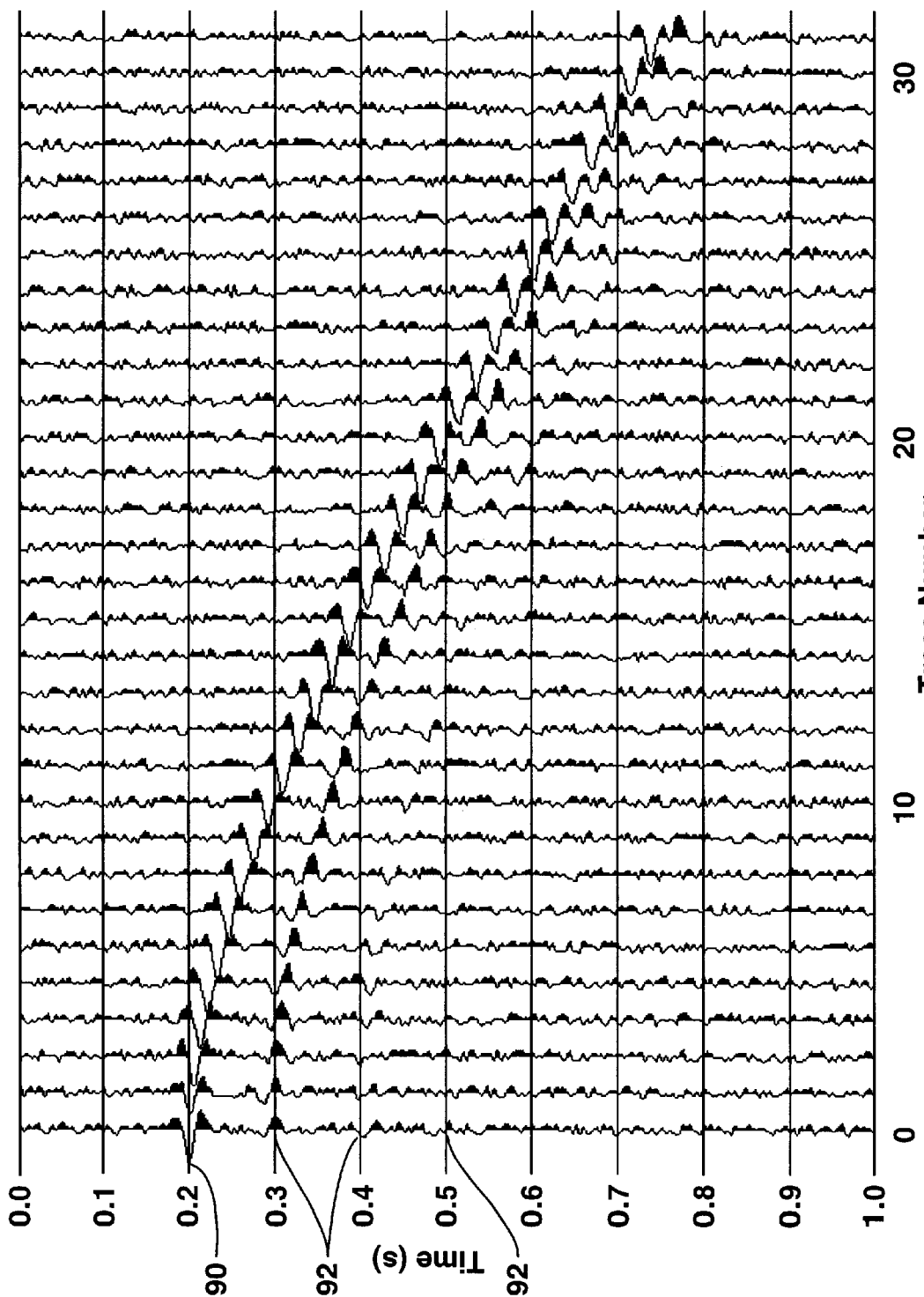
FIG. 6 shows the synthetic CMP gather of FIG. 6 with added measurement noise.

The following is an example of sparse hyperbolic inversion of seismic data using the method described above. FIG. 5 shows a synthetic CMP gather with a primary reflection 90 and intermediate period multiples 92. FIG. 6 shows the data of FIG. 5 with simulated measurement noise added.

The initial model domain comprised a corridor ranging from 80% to 120% of the moveout velocity used to generate the synthetic section. The water-bottom traveltime was allowed to range from 96 ms to 104 ms while the water-bottom reflection coefficient had an allowable range of 0.25 to 0.35. The Ricker wavelet used in generating the seismograms of FIGS. 5 and 6 was used in the inversion. A sparse hyperbolic inversion was carried out using the method given in FIG. 4.

Figure 7:
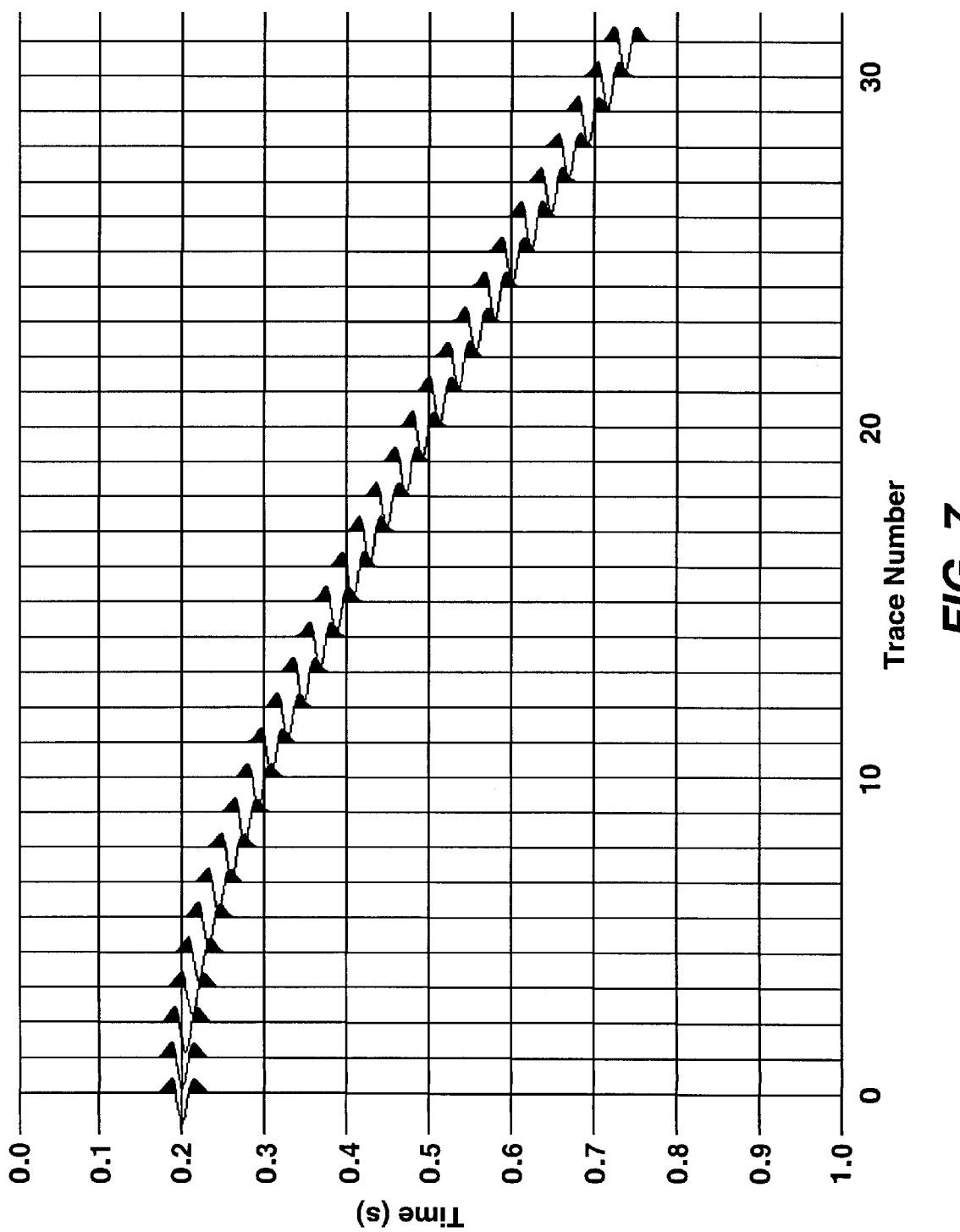
FIG. 7 shows the result of inverting the data of FIG. 7 and then generating a section consisting of primaries only.
Figure 8:
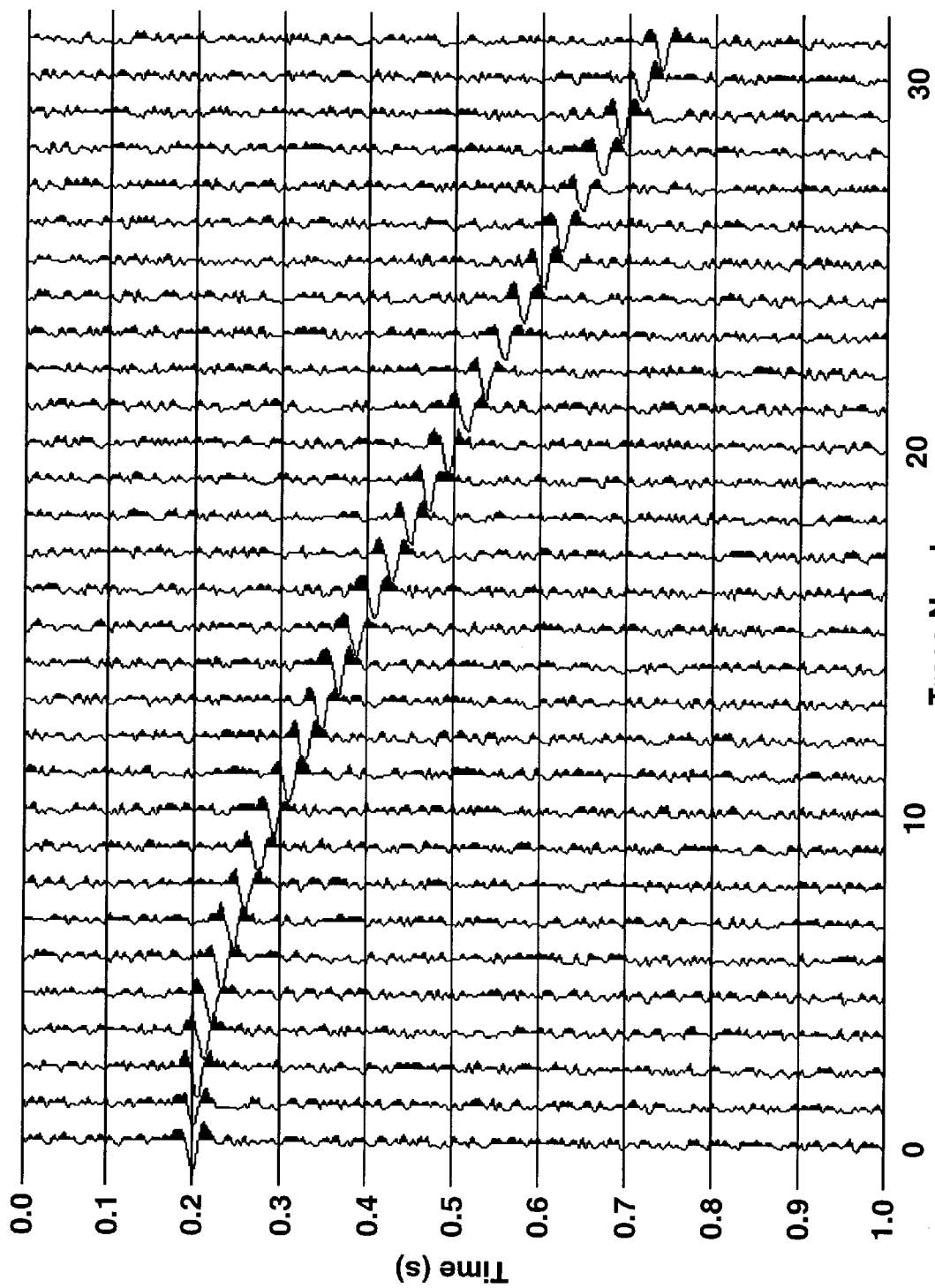
FIG. 8 shows the result of subtracting the multiples obtained using the present invention from the noisy CMP gather of FIG. 6.

FIG. 7 shows the result of using the inverted model derived on the data of FIG. 6 to generate a CMP gather with primary reflections only. The reflection event on the panel is very similar in appearance to the primary reflection of FIG. 5, indicating that the process works well in the presence of random noise. The multiple reflections clearly visible in FIGS. 5 and 6 have been eliminated. FIG. 8 shows a noisy CMP gather with only the primary event which was obtained by subtracting from FIG. 6 a gather consisting of multiples estimated from the noisy gather of FIG. 6.

The invention is not to be unduly limited to the foregoing, which has been set for illustrative purposes. On the contrary, a wide variety of modifications and alternative embodiments will be apparent to persons skilled in the art without departing from the true scope of the invention, as defined in the following claims.

I claim:

1. A method for suppressing water-bottom multiples in a gather of seismic data traces, said method comprising the steps of:
    (a) inverting said gather of seismic data traces from the data domain to the model domain to obtain a model domain representation of said gather, each data sample in said model domain representation being defined in terms of a set of parameters including at least zero-offset traveltime, moveout velocity, two-way water-bottom reflection traveltime, and water-bottom reflection coefficient;
    (b) determining a forward modeling matrix that relates the model domain to the data domain; and
    (c) using said model domain representation and said forward modeling matrix to identify and remove said water-bottom multiples from said gather of seismic data traces.

2. The method of claim 1, wherein said step of using said model domain representation and said forward modeling matrix to identify and remove said water-bottom multiples from said gather comprises forward modeling each non-zero data sample in said model domain representation of said gather to only a primary reflection hyperbola in the data domain to obtain a data domain representation of only the primary reflections in said gather.

3. The method of claim 2, wherein said forward modeling matrix contains an estimate of the seismic wavelet for said gather of seismic data traces.

4. The method of claim 3, wherein said estimate of the seismic wavelet is obtained from measurement of the actual seismic wavelet used to generate said seismic data traces.

5. The method of claim 3, wherein said estimate of the seismic wavelet is obtained from an isolated pulse in said seismic data traces.

6. The method of claim 3, wherein said estimate of the seismic wavelet is a time-varying wavelet.

7. The method of claim 3, wherein said estimate of the seismic wavelet comprises a set of wavelets.

8. The method of claim 1, wherein said step of using said model domain representation and said forward modeling matrix to identify and remove said water-bottom multiples from said gather further comprises the steps of:
    (a) modifying said forward modeling matrix to model only said water-bottom multiples;
    (b) forward modeling said model domain representation of said gather to the data domain using said modified forward modeling matrix to obtain a data domain representation of said water-bottom multiples; and
    (c) subtracting said data domain representation of said water-bottom multiples from said gather of seismic data traces.

9. The method of claim 8, wherein said forward modeling matrix contains an estimate of the seismic wavelet for said gather of seismic data traces.

10. The method of claim 9, wherein said estimate of the seismic wavelet is obtained from measurement of the actual seismic wavelet used to generate said seismic data traces.

11. The method of claim 9, wherein said estimate of the seismic wavelet is obtained from an isolated pulse in said seismic data traces.

12. The method of claim 9, wherein said estimate of the seismic wavelet is a time-varying wavelet.

13. The method of claim 9, wherein said estimate of the seismic wavelet comprises a set of wavelets.

14. The method of claim 1, wherein said step of inverting said gather of seismic data traces from the data domain to the model domain comprises an iterative optimization procedure.

15. The method of claim 14, wherein said iterative optimization procedure comprises the steps of:
    (d) selecting an initial size for said model domain representation and an initial set of input data traces to be modeled;
    (e) iteratively (i) generating synthetic data corresponding to said model domain representation, (ii) comparing said synthetic data to said input data traces using a residual error objective function, and (iii) updating said model domain representation, until the error calculated according to said residual error objective function is less than a preselected maximum error;
    (f) iteratively (i) increasing the number of input data traces, (ii) reducing the size of said model domain representation, (iii) updating said residual error objective function, and (iv) repeating step (e), until all of said seismic data traces have been modeled.

16. The method of claim 15, wherein said residual error objective function is updated using an $L_p$-norm.

17. The method of claim 1, wherein said set of parameters includes water bottom dip.

18. A method for suppressing noise in a gather of seismic data traces, said method comprising the steps of:
    (a) inverting said gather of seismic data traces from the data domain to the model domain to obtain a sparse model domain representation of said gather, each data sample in said sparse model domain representation being defined in terms of a set of parameters including at least zero-offset traveltime and stacking velocity, each primary reflection in said gather being represented by a single data sample in said sparse model domain representation;
    (b) performing a filtering operation on said sparse model domain representation of said gather to suppress data samples relating to said noise; and
    (c) forward modeling said filtered sparse model domain representation of said gather to the data domain.

19. The method of claim 18, wherein said step of forward modeling comprises multiplying said filtered sparse model domain representation of said gather by a forward modeling matrix, said forward modeling matrix containing an estimate of the seismic wavelet for said gather.

20. The method of claim 19, wherein said forward modeling matrix includes a plurality of linear moveouts, each having an associated wavelet, to permit modeling of dispersive noises.

21. The method of claim 18, wherein said step of inverting said gather of seismic data traces from the data domain to the model domain comprises an iterative optimization procedure.

22. The method of claim 21, wherein said iterative optimization procedure comprises the steps of:
  (d) selecting an initial size for said model domain representation and an initial set of input data traces to be modeled;
  (e) iteratively (i) generating synthetic data corresponding to said model domain representation, (ii) comparing said synthetic data to said input data traces using a residual error objective function, and (iii) updating said model domain representation, until the error calculated according to said residual error objective function is less than a preselected maximum error;
  (f) iteratively (i) increasing the number of input data traces, (ii) reducing the size of said model domain representation, (iii) updating said residual error objective function, and (iv) repeating step (e), until all of said seismic data traces have been modeled.

* * * * *